United States Patent [19]

Forsyth et al.

[11] Patent Number: 4,889,438

[45] Date of Patent: Dec. 26, 1989

[54] SERIAL PRINTER CARRIAGE DRIVE WITH BALLISTIC REBOUND REVERSAL

[75] Inventors: John L. Forsyth, Lyndeborough; John P. Conant, Milford, both of N.H.

[73] Assignee: Royden C. Sanders, Jr., Wilton, N.H.

[21] Appl. No.: 336,679

[22] Filed: Apr. 12, 1989

[51] Int. Cl.[4] .............................. B41J 19/30
[52] U.S. Cl. ...................... 400/320; 74/37; 74/25; 400/322; 400/328
[58] Field of Search ............... 400/320, 322, 323, 328, 400/686; 74/25, 26, 27, 37; 310/36, 37

[56] References Cited

U.S. PATENT DOCUMENTS

| | | | |
|---|---|---|---|
| 2,846,623 | 8/1958 | Wolff | 317/180 |
| 3,001,092 | 9/1961 | Nemeth | 310/37 |
| 3,694,782 | 9/1972 | Ray | 335/230 |
| 3,753,481 | 8/1973 | Piola | 74/37 X |
| 3,952,217 | 4/1976 | Rawlings | 310/36 |
| 4,198,170 | 4/1980 | Decker | 74/37 X |
| 4,219,825 | 8/1980 | Heyraud et al. | 310/36 X |
| 4,277,189 | 7/1981 | Howard | 74/37 X |
| 4,281,556 | 8/1981 | Weishew | 74/37 |
| 4,372,698 | 2/1983 | Matsushima | 74/37 X |
| 4,378,705 | 4/1983 | Oka | 74/37 |
| 4,459,054 | 7/1984 | Dollenmayer | 400/322 X |
| 4,507,634 | 3/1985 | Vanderlaan | 310/36 X |
| 4,556,141 | 12/1985 | Faitel | 74/37 X |
| 4,795,285 | 1/1989 | Moriya | 400/320 |
| 4,804,285 | 2/1989 | Bradford | 400/320 |
| 4,834,565 | 5/1989 | Takekoshi | 400/323 X |

Primary Examiner—Paul T. Sewell
Attorney, Agent, or Firm—Davis, Bujold & Streck

[57] ABSTRACT

In a serial printer wherein a bi-directionally operating motor drives a carriage in an oscillatory motion between two end points, an improvement for minimizing the time for direction reversal of the carriage. There is a ballistic rebound device for transferring energy of the moving carriage in one direction into a resilient member and for retransmitting energy absorbed by the resilient member back into the carriage in a direction opposite the one direction. There is also an electrically operated brake for selectively coupling the ballistic rebound device to the carriage. Sensing apparatus is provided for sensing the position of the carriage with respect to the two ends. Finally, logic connected to the sensing device is provided for removing a drive voltage from the motor and connecting the ballistic rebound device to the carriage at points with respect to the end points which wil cause the carriage to stop motion in one direction at a desired position with respect to the end points and for applying a drive voltage to the motor and disconnecting the ballistic rebound device from the motor shaft at points with respect to the end points which will cause the carriage to stop and accelerate to a maximum velocity in a direction opposite the one direction in a minimum amount of time. One version employs a single brake carried by the carriage and another employs a pair of brakes disposed adjacent respective ends of carriage movement.

24 Claims, 5 Drawing Sheets

SERIAL PRINTER CARRIAGE DRIVE WITH BALLISTIC REBOUND REVERSAL

BACKGROUND OF THE INVENTION

This invention relates to dot matrix printers of the serial variety and, more particularly, in a system wherein a member is driven in an oscillatory motion between variable end points, to the improvement for increasing the speed of direction reversal of the member comprising, ballistic rebound means for transferring energy of a moving member in one direction into a resilient member and for retransmitting energy absorbed by the resilient member back into the moving member in a direction opposite the one direction; a non-stretching belt; and, releasable brake means for selectively holding a first end of the ballistic rebound means to prevent movement thereof and for connecting a second end of the ballistic rebound means opposite the first end to the member through the belt at points of reversal of the member adjacent the end points.

Dot matrix types of printers have been and continue to be very popular for use with computers. They are generally quite fast in operation and less costly than other types of printers operating at comparable speeds. Recently, the dot matrix printer art has undergone a technological leap forward in performance by the introduction of ballistic shuttle type dot matrix printers. As shown in simplified form in FIG. 1, a shuttle printer 10 incorporates a moving carriage 12 containing multiple print heads (not shown for simplicity) which is driven back and forth (i.e. shuttled) between the ends of movement on rails 14 by a linear motor generally indicated as 16. This approach was introduced by the inventor herein to supercede earlier driving arrangements wherein a bellcrank driven by a conventional motor was used to drive the carriage 12 in its oscillatory motion. The bellcrank drives simply could not reverse the direction of movement of the carriage 12 fast enough. As a result, printer throughput was greatly limited. By employing the linear motor 16 and having the carriage 12 strike a resilient member 18 (e.g. a spring or elastomeric block) the inventor herein found that the reversal time of the carriage 12 could be greatly improved to less than 1 millisecond with an attendant increase in printer throughput.

Figures 1, 2, 3:
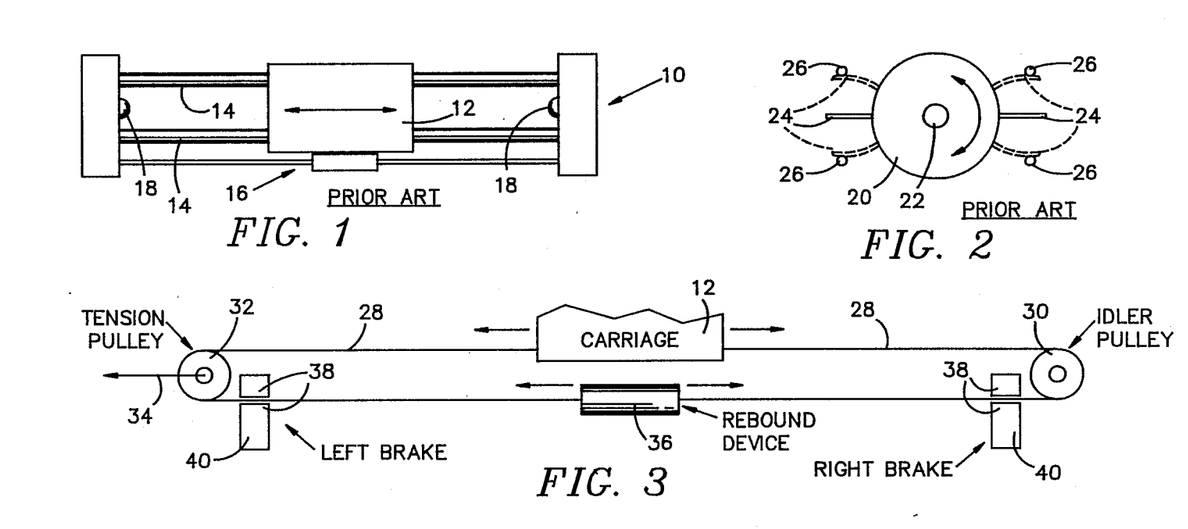
FIG. 1 is a simplified drawing of a shuttle dot matrix printer showing the prior art technique of rebounding the carriage against a resilient stop at each end of its travel.
FIG. 2 is a simplified plan view drawing of a serial dot matrix printer showing the prior art showing the technique of reversing the carriage by means of the carriage motor.
FIG. 3 is a simplified drawing depicting one approach to the present invention.

A shuttle printer or line printer is characterized by always being able to print a complete line regardless of the actual line that needs to be printed. It save no time if the line that is being printed is short. Shuttle printers are usually one row of horizontal actuators evenly spaced which print one dot line at a time. Shuttle printers need fast turnaround at the end of the horizontal carriage motion but it is always at a fixed point and so the device shown in FIG. 1 is quite adequate to give very fast turnaround times.

A serial printer is a printer having n pins spaced vertically or in a pattern which is small compared to total print line length, but which can and does shorten the carriage motion to adapt to the length of the print line actually being printed at a given instant. This type of printer needs a fast turnaround although not usually as fast as the shuttle printer. It is different from the shuttle printer in that the turnaround point can be different on every line. Obtaining fast turnarounds at variable points horizontally is an objective of this invention.

Current serial printers have serious loss of throughput due to excessively long turnaround times. Unlike shuttle printers, the carriage must reverse anyplace along its length. The average letter has an average line width of about 4.5 inches and the maximum print line is usually 8 or 13.2 inches. In current printers the time taken for the carriage to slow, stop, reverse, and reach traverse speed is over 100 milliseconds with a typical time being 150 milliseconds. With the new higher speed printheads coming into use, the speed of traverse has been increased to at least 33 inches per second (ips) and may be as high as 46.7 ips. At 46.7 ips, an eight inch traverse by the carriage will take 171 milliseconds. As can be immediately appreciated, a turnaround time of 150 milliseconds substantially reduces the effective printing speed of the printer.

What is desired is a means of reducing the turnaround time to about 20 milliseconds in an economically priced system. It is generally agreed that reducing the turnaround time below that to any great extent in a serial printer will not materially affect the effective printing speed of the printer and may add significantly to the cost.

In today's serial printers, the carriage motor size and cost is determined by this reversal speed and about the best it can do is turnaround times of about 90 milliseconds and settling times of 60 milliseconds.

Wherefore, it is the principal object of the present invention to provide a method and apparatus for use in the driving of the carriage in a serial printer which can affect turnaround of the carriage in 20 milliseconds in a manner which is economical to produce on a commercial basis.

Other objects and benefits of this invention will become apparent from the detailed description which follows hereinafter when taken in conjunction with the drawing figures which accompany it.

SUMMARY

The foregoing object has been achieved in a serial printer wherein a bi-directional motor drive drives a carriage in an oscillatory motion between two variable end points by the improvement of the present invention for minimizing the time for direction reversal of the carriage comprising, ballistic rebound means for transferring energy of the carriage in one direction into a resilient member and for retransmitting energy absorbed by the resilient member back into the carriage in a direction opposite the one direction; a non-stretching belt; and, releasable brake means for selectively holding a first end of the ballistic rebound means to prevent movement thereof and for connecting a second end of the ballistic rebound means opposite the first end to the carriage through the belt at points of reversal of the carriage adjacent the end points.

In the preferred embodiment, the releasable brake means comprises an electrically operated opposed pair of jaws for gripping the belt. The preferred embodiment also includes sensing means for sensing the position of the carriage with respect to the two ends and logic means connected to the sensing means for removing a drive voltage from the motor and connecting the ballistic rebound means to the carriage at points with respect to the end points which will cause the carriage to stop motion in one direction at a desired position with respect to the end points and for applying a drive voltage to the motor and disconnecting the ballistic rebound means from the carriage at points with respect to the end points which will cause the carriage to stop and accelerate to a maximum velocity in a direction opposite the one direction in a minimum amount of time.

In one embodiment the belt is connected as a loop from the carriage over a first pulley adjacent one end point to a first end of the ballistic rebound means and from a second end of the ballistic rebound means opposite the first end over a second pulley adjacent the other end point and back to the carriage; and, the releasable brake means comprises a first clamp brake disposed adjacent the first pulley including jaws for gripping and holding the belt and a second clamp brake disposed adjacent the second pulley including jaws for gripping and holding the belt. Additionally, there are tensioning means holding the second pulley for adjustably pulling the second pulley away from the first pulley whereby the tension in the belt can be adjusted.

In another embodiment, the ballistic rebound means comprises a first rebound device attached on a first end to a first holding member adjacent one end point and a second rebound device attached on a first end to a second holding member adjacent the other end point; the belt is connected between a second end of the first rebound device opposite the first end thereof and a second end of the second rebound device opposite the first end thereof; and, the releasable brake means comprises a clamp brake carried by the carriage including jaws for gripping and holding the belt. Additionally, there are tensioning means holding the second holding member for adjustably pulling the second holding member away from the first holding member whereby the tension in the belt can be adjusted.

DESCRIPTION OF THE PREFERRED EMBODIMENT

The prior art approach of FIG. 1 shows a successful method of reversing the carriage in 1 or 2 milliseconds as applied to shuttle printer. The carriage 12 is moved horizontally at a linear speed along the carriage rails 14 by the linear motor 16 until it meets the rubber bumper 18 at which times the velocity of the carriage is reversed with about 80% or more energy efficiency and at 90% or more of its impact velocity in 1 to 3 milliseconds. Means, not shown, are used to isolate the rebound force from the main section of the printer.

This is an excellent method for a shuttle printer but is not applicable for serial printers for the following reasons.

1. The carriage can only be reversed at the end of a full stroke and so would be very inefficient for the short strokes commonly used by a serial printer.
2. Shuttle printers commonly use strokes under 1 inch of travel where a linear motor is relatively efficient. Linear motors would get very big and inefficient with strokes of 8" to 13.2".

FIG. 2 illustrates one of the present methods of reversing the carriage in serial printers. The carriage 12 is moved back and forth on rails 14 by the carriage motor 44 through the pulley 42 and the timing belt 34. The motor 44 must supply all the power needed to reverse its own rotor inertia as well as inertia of the carriage 12. The power taken to reverse the carriage even as slow as 90 to 100 milliseconds is many times that needed to keep the carriage at constant speed while printing. In addition, a stabilization is required for the carriage to reach printing speed because of the lack of a horizontal position sensor 28 and 29 shown in FIG. 3.

As is well known, an electrical brake can be applied almost instantaneously (i.e., 2 to 3 milliseconds). Thus, if an electrical brake can be employed to connect a highly efficient and sturdy rebound device to the carriage 12 in a serial printer 10, the reversal can be accomplished exactly at the desired time in the movement of the carriage and, further, it can be accomplished repeatedly in the minimal time duration desired without damage to undersized parts. This is exactly the approach taken by this invention. Two ways of accomplishing this objective according to the present invention are shown in simplified form in FIGS. 3 and 4. In the approach of FIG. 3, a belt 28 of a relatively non-stretching material is attached as a loop to the carriage 12 with one end passing over an idler pulley 30 and the other end passing over a tension pulley 32 which can be pulled outward as indicated by the arrow 34 to place the belt 28 under tension. A rebound device 36 is inserted into the loop of the belt 28 at 180 degrees from the carriage 12. Thus, like the counterweight of an elevator, as the carriage 12 moves in one direction, the rebound device 36 moves in the opposite direction. Adjacent the two ends of movement of the carriage 12, the belt 28 passes through the jaws 38 of an electrically operated clamp brake 40. The rebound device 36 can be a damped spring, or the like, having a high spring constant which will quickly absorb the ballistic energy of the carriage 12, bring is to a stop in a minimum time, and then rebound to provide a maximum acceleration of the carriage 12 in the opposite direction. The mode of operation of this configuration can be readily understood from reference to FIG. 3 and the following example. Assume the carriage 12 is moving to the right as the figure is viewed. The rebound device 36, therefore, is moving to the left at the same rate. When the carriage 12 arrives at the point of reversal, the right clamp brake 40 is activated causing the belt 28 to be gripped and held by the jaws 38 thereof. As the carriage 12 continues to the right, the left portion of the belt 28 pulls against the rebound device 36 which is being held against movement on the opposite end (i.e. the right side) by the right brake 40 holding the right portion of the belt 28. This pulling force (i.e. the ballistic force of the moving carriage 12) is absorbed by the rebound device 36 bring the carriage 12 quickly to a stop. The rebound device 36 then rebounds (i.e. shortens in length) creating a large and rapid pulling force on the left portion of the belt 28 which, in turn, pulls on and accelerates the carriage 12 to the left as the figure is viewed. Simultaneously, the right brake 40 is released so that the carriage (and belt 28) can move to the left. At the left end, the process is repeated with the left brake 40.

The carriage 12 has a mass M12 and the timing belt 28 has a compliance S34. Together M12 and S34 are resonant at fc although this resonance is highly damped due to the friction between the carriage 12 and the carriage rods 14. Nevertheless, it is important that 1/fc be less than one third of the turnaround time of the motor mass and that this dynamic action be accounted for in the total turnaround time.

Figure 4:
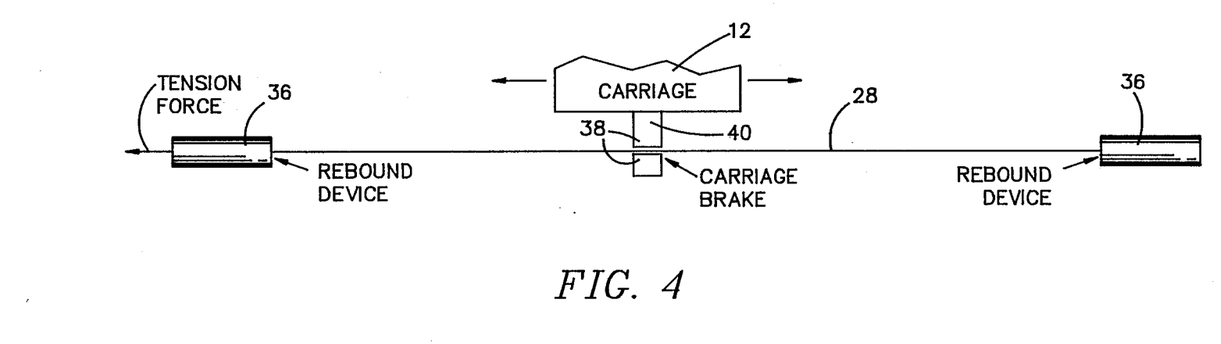
FIG. 4 is a simplified drawing depicting another approach to the present invention.

In the approach of FIG. 4, the belt 28 of non-stretching material is attached between a pair of rebound devices 36 located adjacent the two ends of movement of the carriage 12. The belt 28 passes through the jaws 38 of an electrically operated clamp brake 40 carried by the carriage 12. The mode of operation of this configuration can be readily understood from reference to FIG. 4 and the following example. Again, assume the carriage 12 is moving to the right as the figure is viewed. When the carriage 12 arrives at the point of reversal, the clamp brake 40 is activated causing the belt 28 to be gripped and held by the jaws 38 thereof. As the carriage 12 continues to the right, it pulls against the left rebound device 36 through the belt 28. This pulling force (i.e. the ballistic force of the moving carriage 12) is absorbed by the left rebound device 36 bring the carriage 12 quickly to a stop. The left rebound device 36 then rebounds (i.e. shortens in length) creating a large and rapid pulling force on the left portion of the belt 28 between the left rebound device 36 and the brake 40 which, in turn, pulls on and accelerates the carriage 12 to the left as the figure is viewed. Simultaneously, the brake 40 is released so that the carriage can move to the left. At the left end, the process is repeated with the right rebound device 36.

Figure 5:
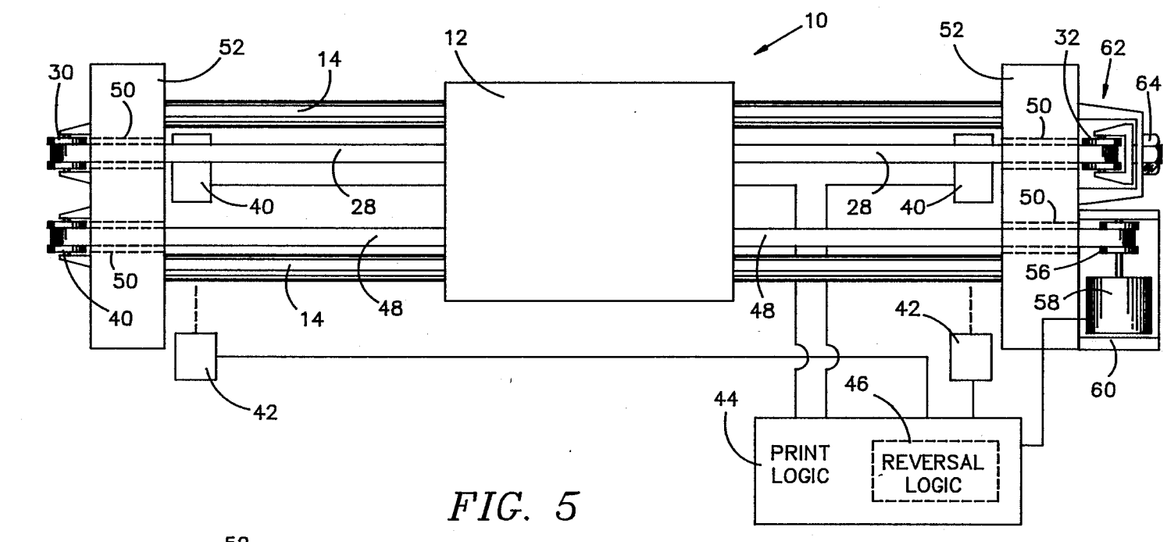
FIG. 5 is a simplified plan view drawing of a serial dot matrix printer according to the present invention in the manner of FIG. 3 showing the technique of rebounding the carriage by means of a rebound device carried by a non-stretching belt moving with the carriage which is releasably gripped by clamp brakes mounted at the ends of the carriage travel to affect reversal of the carriage.
Figure 6:
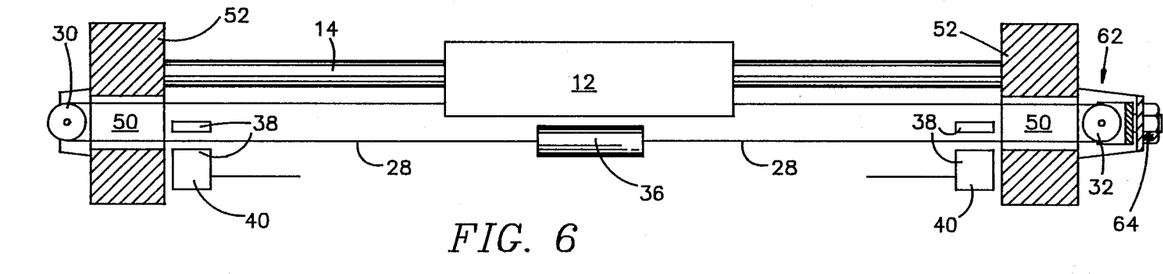
FIG. 6 is a partial front view of the apparatus of FIG. 5.
Figure 7:
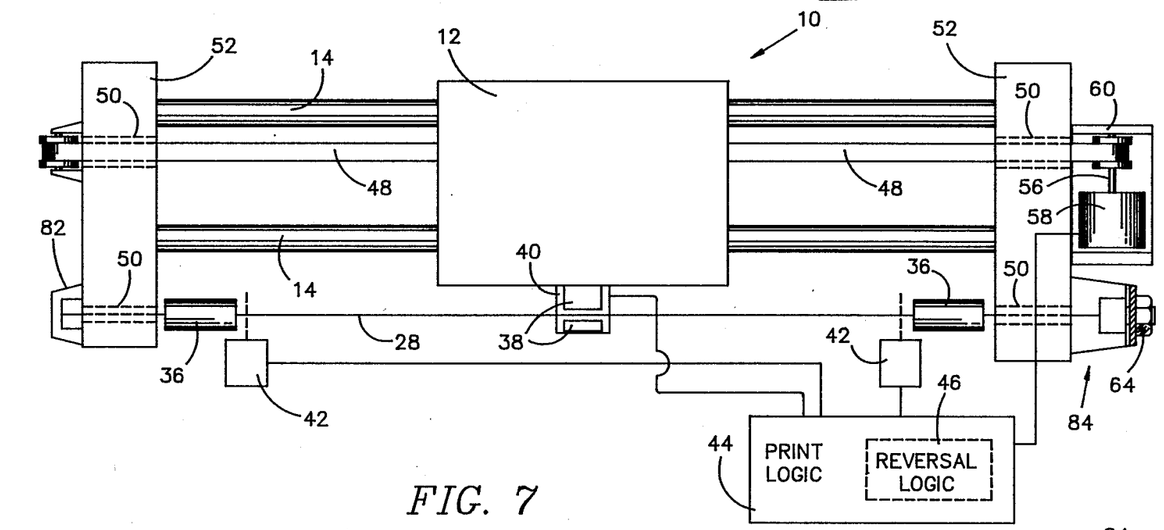
FIG. 7 is a simplified plan view drawing of a serial dot matrix printer according to the present invention in the manner of FIG. 4 showing the technique of rebounding the carriage by means of a pair of rebound devices mounted on opposite ends of a fixed non-stretching belt which is releasably gripped by a clamp brake carried by the carriage to affect reversal of the carriage.
Figure 8:
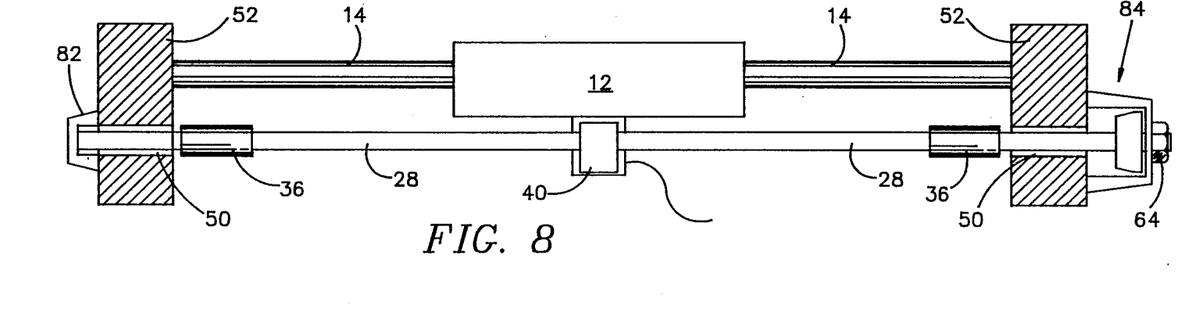
FIG. 8 is a partial front view of the apparatus of FIG. 7.

Apparatus for the approach of FIG. 3 is shown in greater detail in FIGS. 5 and 6 while apparatus for the approach of FIG. 4 is shown in greater detail in FIGS. 7 and 8.

As depicted in FIGS. 5 and 6, a serial printer 10 operating according to the present invention again includes a carriage 12 moving back and forth on rails 14. As in the preferred prior approaches, there is some sort of optical position sensing apparatus 42 employed for providing continuous information on the position of the carriage 12 to the print logic 44. For the present invention, the print logic 44 additionally includes reversal logic 46 receiving control signals dependent on the positional signals from the position sensing apparatus 42. In other words, the reversal logic 46 can make its own reversal decisions based on direct positional inputs from the apparatus 42 or can respond to reversal commands from the print logic 44 based on positional inputs from the apparatus 42. The exact manner of accomplishing the reversal logic 46 associated with the present invention is not a critical aspect thereof and can be according to convenience in the particular implementation thereof.

The carriage is driven by a belt 48 of a relatively nonstretching material as generally available in the art. The belt 48 is in the form of a loop which is attached to the carriage 12 at one point. The belt 48 passes through slots 50 in the frame 52 of the printer 10 as necessary and, additionally, is supported for rotation on one end by an idler pulley 54 and on the other end by a drive pulley 56. The drive pulley 56, in turn, is driven bi-directionally by a motor 58 mounted on a support member 60 which is mounted to 15 the frame 52 of the printer 10 with the belt 48 in proper parallel alignment with the rails 14 to affect optimum drive forces to the carriage 12. The rebound belt 28 is in two portions as previously described. One portion goes from a point of attachment to the carriage 12 over idler pulley 30 and back to one end of the rebound device 36 through slots 50 in the frame 52 in the manner of belt 48. The other portion goes from a point of attachment to the carriage 12 on the opposite side thereof over tension pulley 32 and back to one end of the rebound device 36 also through slots 50 in the frame 52. While the idler pulley 30 is mounted for rotation directly to the frame 52, the tension pulley 32 is mounted to an adjusting member 62 mounted to the frame 52. By turning the nut 64, the tension in the belt 28 can be adjusted to a desired level for operation.

At the proper point of reversal, the logic 44, 46 sends a signal to the proper brake 40 (left or right) causing it to clamp the belt 28 in the manner described above and thereby connect the rebound device 36 to the carriage 12. Again, as described earlier, virtually instantaneously, the rebound device 36 absorbs the ballistic energy of the carriage 12 and retransmits it back to the carriage 12 in the opposite direction to affect the desired 20 millisecond reversal. When the direction has been reversed and before the rebound device 36 can impart an undesired counter force, it is disconnected by the brake 40 under the control of the logic 44, 46.

Figure 9:
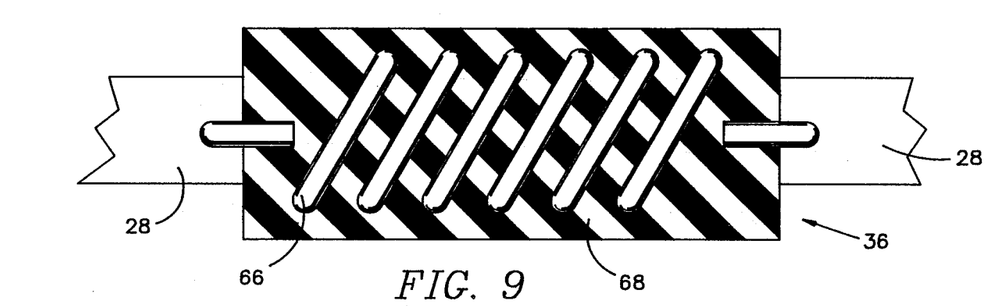
FIG. 9 is a simplified cutaway side view of one type of damped spring that can be employed as the rebound device in the various embodiments of the present invention.
Figure 10:
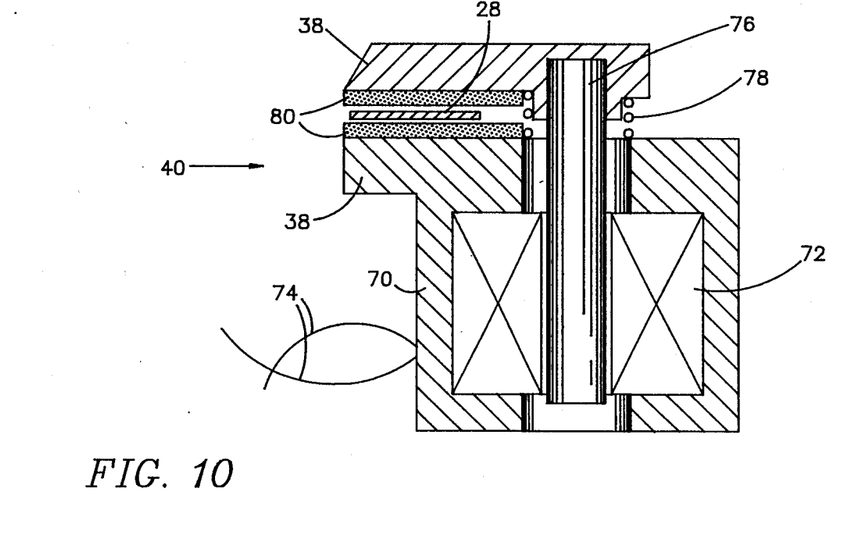
FIG. 10 is a simplified cutaway side view of one type of clamp brake that can be employed in the various embodiments of the present invention.

The rebound device 36 can take several forms to attain the objects of the invention successfully. As shown in simplified form in FIG. 9, it may comprise a spring 66 mounted within an elastomeric material 68 which acts to damp the spring. The spring 66 could also be mounted in parallel with a damping device, if desired. Several other damping devices which could be adapted for use in this invention are shown in my co-pending application Ser. No. 07/336,840, filed Apr. 12, 1989, also entitled SERIAL PRINTER CARRIAGE DRIVE WITH BALLISTIC REBOUND REVERSAL. The clamp brakes 40 can be constructed in the manner shown in FIG. 10. One jaw 38 is part of a body portion 70 containing a solenoid coil 72 activated by wires 74. The other jaw 38 is mounted t a solenoid armature 76 movably mounted within the coil 72. The armature 76 is urged upward (separating the jaws 38) by the spring 78. The jaws are faced with a high friction material 80. Thus, when a DC voltage is applied to the coil 72 through wires 74, the top jaw 38 is pulled tightly against the bottom jaw 38 thus clamping the belt 28 between them.

The serial printer of FIGS. 7 and 8 also includes a carriage 12 moving back and forth on rails 14 and some sort of optical position sensing apparatus 42 employed for providing continuous information on the position of the carriage 12 to the print logic 44 and reversal logic 46. The carriage is again driven by a belt 48 of a non-stretching material by means of a motor 58 mounted on a support member 60 which is mounted to the frame 52 of the printer 10. The rebound belt 28 is a single straight piece as previously described. One end passes through slots 50 in the frame 52 in the manner of belt 48 and affixes to a holding member 82. The other end also passes through slots 50 in the frame 52 to an adjusting member 84 mounted to the frame 52. Like the adjusting member 62 of the previous embodiment, by turning the nut 64, the tension in the belt 28 can be adjusted to a desired level for operation. The rebound devices 36 and single clamp brake 40 carried by the carriage 12 can be substantially as described above. Since the print heads carried by the carriage 12 are connected by flexible conductors, the connection to the brake 40 can be made in the same manner. At the proper point of reversal, the logic 44, 46 sends a signal to the brake 40 on the carriage 12 causing it to clamp the belt 28 in the manner described above and thereby connect the left or right rebound device 36, as appropriate, to the carriage 12. Again, as described earlier, virtually instantaneously, the rebound device 36 absorbs the ballistic energy of the carriage 12 and retransmits it back to the carriage 12 in the opposite direction to affect the desired 20 millisecond reversal. Likewise, when the direction has been reversed and before the rebound device 36 can impart an undesired counter force, it is disconnected by the brake 40 under the control of the logic 44, 46.

Figure 11:
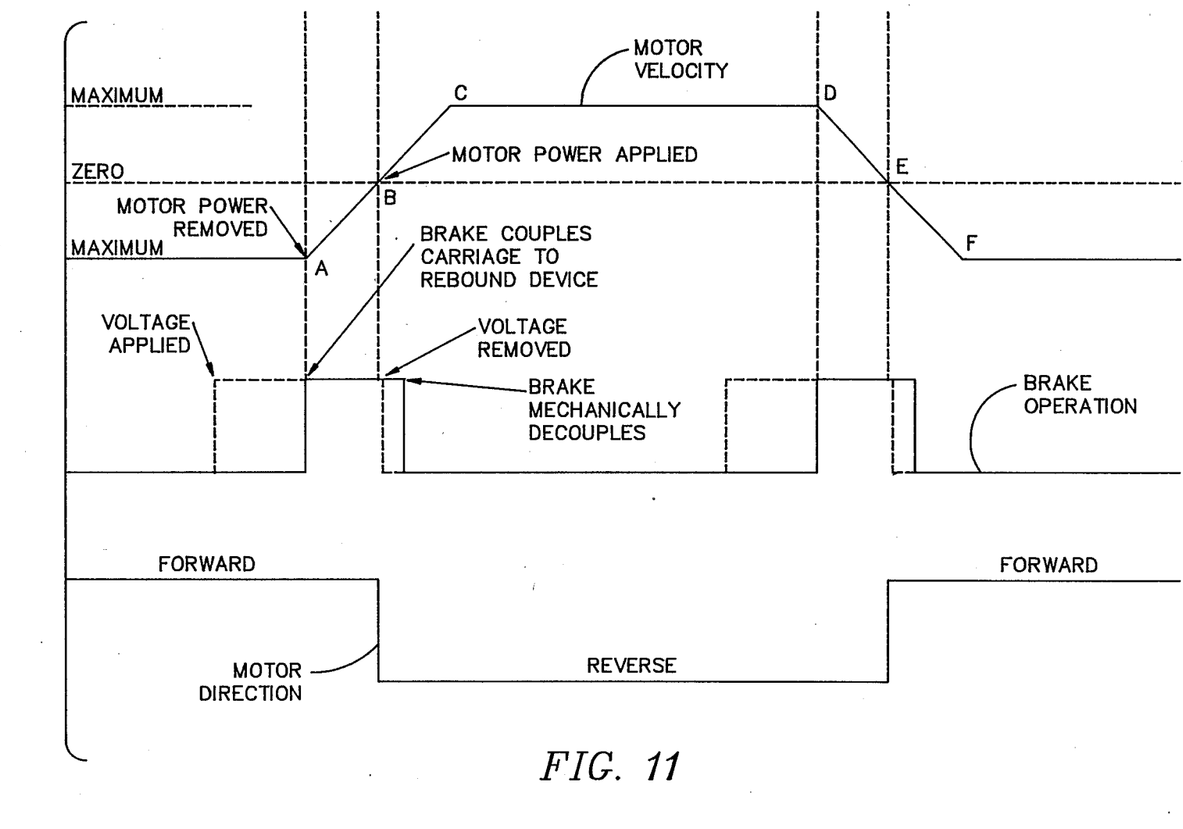
FIG. 11 is a timing chart showing the operation sequence employed in the present invention.

Regardless of the embodiment, the motor 58 and rebound device(s) 36 (through brake(s) 40) are operated by the logic 44, 46 in the manner shown in FIG. 13. With the motor 58 moving in a "forward" direction (where "forward" and "backward" are arbitrary directions) and assuming that reversal is to be affected at point "A", the DC voltage is applied to the brake 40 prior to point A at a sensed distance such that brake 40 will couple the carriage 12 to the rebound device 36 as the carriage 12 reaches point A. Simultaneously with the carriage 12 reaching point A and the brake 40 coupling the carriage 12 to the rebound device 36, the driving power is removed from the motor 58. As can be seen, the coupled rebound device 36 then rapidly decelerates the carriage 12, absorbs it ballistic energy, and starts to retransmit it into the carriage 12 in the opposite direction. As the carriage 12 starts to move in the opposite direction, energy is reapplied to the motor 58 in that direction. As with the application of the rebound device 36 through the brake 40 the release of the rebound device 36 takes some time; that is, by removing the DC voltage from the brake 40, the jaws 38 of the brake 40 are not unclamped from the belt 28 immediately. As those skilled in the art will appreciate, the release timing is more critical than the connect timing. What is desired is to retrieve the maximum stored ballistic energy from the rebound device 36 to assist in the acceleration of the carriage 12 in the opposite direction while preventing the rebound device 36 from applying a breaking force in the opposite direction or otherwise interfering with the motion of the carriage 12. Thus, as shown in the drawing of FIG. 13, the DC voltage is removed from the rebound device 36 at a time between points B and C such that the brake 40 will decouple the rebound device 36 from the carriage 12 just prior to the rebound device 36 reaching its neutral point.

Wherefore, having thus described the present invention,

What is claimed is:

1. In a system wherein a member is driven in an oscillatory motion between two end points, the improvement for increasing the speed of direction reversal of the member comprising:
   (a) ballistic rebound means for transferring energy of a moving member in one direction into a resilient member and for retransmitting energy absorbed by said resilient member back into the moving member in a direction opposite said one direction;
   (b) a non-stretching belt; and,
   (c) releasable brake means for selectively holding a first end of said ballistic rebound means to prevent movement thereof and for connecting a second end of said ballistic rebound means opposite said first end to the member through said belt at points of reversal of the member adjacent the end points.

2. The improvement to an oscillatory member drive of claim 1 wherein:
   said releasable brake means comprises an electrically operated opposed pair of jaws for gripping said belt.

3. The improvement to an oscillatory member drive of claim 1 wherein the member is driven by a bi-directionally rotating electric motor and additionally comprising:
   (a) sensing means for sensing the position of the member with respect to the two ends; and,
   (b) logic means connected to said sensing means for removing a drive voltage from the motor and connecting said ballistic rebound means to the member at points with respect to the end points which will cause the member to stop motion in one direction at a desired position with respect to the end points and for applying a drive voltage to the motor and disconnecting said ballistic rebound means from the member at points with respect to the end points which will cause the member to stop and accelerate to a maximum velocity in a direction opposite said one direction in a minimum amount of time.

4. The improvement to an oscillatory member drive of claim 1 wherein:
   (a) said belt is connected as a loop from said member over a first pulley adjacent one end point to a first end of said ballistic rebound means and from a second end of said ballistic rebound means opposite said first end over a second pulley adjacent the other end point and back to said member; and,
   (b) said releasable brake means comprises a first clamp brake disposed adjacent said first pulley including jaws for gripping and holding said belt and a second clamp brake disposed adjacent said second pulley including jaws for gripping and holding said belt.

5. The improvement to an oscillatory member drive of claim 4 and additionally comprising:
   tensioning means holding said second pulley for adjustably pulling said second pulley away from said first pulley whereby the tension in said belt can be adjusted.

6. The improvement to an oscillatory member drive of claim 1 wherein:
(a) said ballistic rebound means comprises a first rebound device attached on a first end to a first holding member adjacent one end point and a second rebound device attached on a first end to a second holding member adjacent the other end point;
(b) said belt is connected between a second end of said first rebound device opposite said first end thereof and a second end of said second rebound device opposite said first end thereof; and,
(c) said releasable brake means comprises a clamp brake carried by the member including jaws for gripping and holding said belt.

7. The improvement to an oscillatory member drive of claim 6 and additionally comprising:
tensioning means holding said second holding member for adjustably pulling said second holding member away from said first holding member whereby the tension in said belt can be adjusted.

8. In a serial printer wherein a bi-directional motor drive drives a carriage in an oscillatory motion between two end points, the improvement for minimizing the time for direction reversal of the carriage comprising:
(a) ballistic rebound means for transferring energy of the carriage in one direction into a resilient member and for retransmitting energy absorbed by said resilient member back into the carriage in a direction opposite said one direction;
(b) a non-stretching belt; and,
(c) releasable brake means for selectively holding a first end of said ballistic rebound means to prevent movement thereof and for connecting a second end of said ballistic rebound means opposite said first end to the carriage through said belt at points of reversal of the carriage adjacent the end points.

9. The improvement to a serial printer of claim 8 wherein:
said releasable brake means comprises an electrically operated opposed pair of jaws for gripping said belt.

10. The improvement to a serial printer of claim 8 and additionally comprising:
(a) sensing means for sensing the position of the carriage with respect to the two ends; and,
(b) logic means connected to said sensing means for removing a drive voltage from the motor and connecting said ballistic rebound means to the carriage at points with respect to the end points which will cause the carriage to stop motion in one direction at a desired position with respect to the end points and for applying a drive voltage to the motor and disconnecting said ballistic rebound means from the carriage at points with respect to the end points which will cause the carriage to stop and accelerate to a maximum velocity in a direction opposite said one direction in a minimum amount of time.

11. The improvement to a serial printer of claim 8 wherein:
(a) said belt is connected as a loop from said carriage over a first pulley adjacent one end point to a first end of said ballistic rebound means and from a second end of said ballistic rebound means opposite said first end over a second pulley adjacent the other end point and back to said carriage; and,
(b) said releasable brake means comprises a first clamp brake disposed adjacent said first pulley including jaws for gripping and holding said belt and a second clamp brake disposed adjacent said second pulley including jaws for gripping and holding said belt.

12. The improvement to a serial printer of claim 11 and additionally comprising:
tensioning means holding said second pulley for adjustably pulling said second pulley away from said first pulley whereby the tension in said belt can be adjusted.

13. The improvement to a serial printer of claim 8 wherein:
(a) said ballistic rebound means comprises a first rebound device attached on a first end to a first holding member adjacent one end point and a second rebound device attached on a first end to a second holding member adjacent the other end point;
(b) said belt is connected between a second end of said first rebound device opposite said first end thereof and a second end of said second rebound device opposite said first end thereof; and,
(c) said releasable brake means comprises a clamp brake carried by the carriage including jaws for gripping and holding said belt.

14. The improvement to a serial printer of claim 13 and additionally comprising:
tensioning means holding said second holding member for adjustably pulling said second holding member away from said first holding member whereby the tension in said belt can be adjusted.

15. In a serial printer wherein a bi-directional motor drive drives a carriage in an oscillatory motion between two end points, the improvement for minimizing the time for direction reversal of the carriage comprising:
(a) ballistic rebound means for transferring energy of the carriage in one direction into a resilient member and for retransmitting energy absorbed by said resilient member back into the carriage in a direction opposite said one direction;
(b) a non-stretching belt;
(c) releasable brake means for selectively holding a first end of said ballistic rebound means to prevent movement thereof and for connecting a second end of said ballistic rebound means opposite said first end to the carriage through said belt;
(d) sensing means for sensing the position of the carriage with respect to the two ends; and,
(e) logic means connected to said sensing means for removing a drive voltage from the motor and connecting said ballistic rebound means to the carriage at points with respect to the end points which will cause the carriage to stop motion in one direction at a desired position with respect to the end points and for applying a drive voltage to the motor and disconnecting said ballistic rebound means from the carriage at points with respect to the end points which will cause the carriage to stop and accelerate to a maximum velocity in a direction opposite said one direction in a minimum amount of time.

16. The improvement to a serial printer of claim 15 wherein:
said releasable brake means comprises an electrically operated opposed pair of jaws for gripping said belt.

17. The improvement to a serial printer of claim 15 wherein:

(a) said belt is connected as a loop from said carriage over a first pulley adjacent one end point to a first end of said ballistic rebound means and from a second end of said ballistic rebound means opposite said first end over a second pulley adjacent the other end point and back to said carriage; and, (b) said releasable brake means comprises a first clamp brake disposed adjacent said first pulley including jaws for gripping and holding said belt and a second clamp brake disposed adjacent said second pulley including jaws for gripping and holding said belt.

18. The improvement to a serial printer of claim 17 and additionally comprising:

tensioning means holding said second pulley for adjustably pulling said second pulley away from said first pulley whereby the tension in said belt can be adjusted.

19. The improvement to a serial printer of claim 15 wherein:

(a) said ballistic rebound means comprises a first rebound device attached on a first end to a first holding member adjacent one end point and a second rebound device attached on a first end to a second holding member adjacent the other end point;

(b) said belt is connected between a second end of said first rebound device opposite said first end thereof and a second end of said second rebound device opposite said first end thereof; and, (c) said releasable brake means comprises a clamp brake carried by the carriage including jaws for gripping and holding said belt.

20. The improvement to a serial printer of claim 19 and additionally comprising:

tensioning means holding said second holding member for adjustably pulling said second holding member away from said first holding member whereby the tension in said belt can be adjusted.

21. In a serial printer wherein a bi-directionally operating motor with a shaft drives a carriage in an oscillatory motion between two end points, the method of operation for minimizing the time for direction reversal of the carriage comprising the steps of:

(a) providing ballistic rebound means capable of transferring energy of the carriage in one direction into a resilient member and retransmitting energy absorbed by the resilient member back into the carriage in a direction opposite the one direction;

(b) providing a non-stretching belt;

(c) providing a releasable brake means capable of selectively holding a first end of the ballistic rebound means to prevent movement thereof and connecting a second end of the ballistic rebound means opposite the first end to the carriage through the belt;

(d) sensing the position of the carriage with respect to the two ends; and, (e) removing a drive voltage from the motor and connecting the ballistic rebound means to the carriage at points with respect to the end points which will cause the carriage to stop motion in one direction at a desired position with respect to the end points and for applying a drive voltage to the motor and disconnecting the ballistic rebound means from the carriage at points with respect to the end points which will cause the carriage to stop and accelerate to a maximum velocity in a direction opposite the one direction in a minimum amount of time.

22. The method of claim 21 wherein the releasable brake means comprises an electrically operated opposed pair of jaws for gripping the belt and said step of connecting the ballistic rebound means to the carriage comprises the step of:

applying an electrical voltage to the opposed pair of jaws to cause them to grip the belt.

23. The method of claim 21 and additionally comprising the step of:

(a) connecting the belt as a loop from the carriage over a first pulley adjacent one end point to a first end of the ballistic rebound means and from a second end of the ballistic rebound means opposite the first end over a second pulley adjacent the other end point and back to the carriage; and wherein, (b) the releasable brake means comprises a first clamp brake disposed adjacent the first pulley including jaws for gripping and holding the belt and a second clamp brake disposed adjacent the second pulley including jaws for gripping and holding the belt; and, (c) said step of connecting the ballistic rebound means to the carriage comprises the step of activating the one of the clamp brakes opposite the direction of movement of the carriage to cause the opposed pair of jaws thereof to grip the belt.

24. The method of claim 21 wherein the releasable brake means comprises a clamp brake carried by the carriage including jaws for gripping and holding the belt and additionally comprising the steps of:

(a) connecting a first rebound device on a first end to a first holding member adjacent one end point;

(b) connecting a second rebound device on a first end to a second holding member adjacent the other end point;

(c) connecting the belt between a second end of the first rebound device opposite the first end thereof and a second end of the second rebound device opposite the first end thereof; and, (d) said step of connecting the ballistic rebound means to the carriage comprises the step of activating the clamp brake to cause the opposed pair of jaws thereof to grip the belt.

* * * * *